(12) United States Patent  
Lai

(10) Patent No.: US 7,574,815 B1  
(45) Date of Patent: Aug. 18, 2009

(54) WHEELED DISTANCE MEASURING DEVICE

(75) Inventor: Ying Wu Lai, Miauli (TW)

(73) Assignee: Cheng Lin Wang, Tonro Tsuen Tonro Hsiang Miauli (TW)

( * ) Notice: Subject to any disclaimer, the term of this patent is extended or adjusted under 35 U.S.C. 154(b) by 0 days.

(21) Appl. No.: 12/319,660

(22) Filed: Jan. 8, 2009

(51) Int. Cl.  
*G01B 3/12* (2006.01)

(52) U.S. Cl. .......................................... 33/772; 33/779

(58) Field of Classification Search ............... 33/533, 33/772–782; D10/70  
See application file for complete search history.

(56) References Cited

U.S. PATENT DOCUMENTS

| | | | | | |
|---|---|---|---|---|---|
| 1,835,804 | A | * | 12/1931 | Morra | 33/781 |
| 2,110,757 | A | * | 3/1938 | Clarke | 33/773 |
| 2,741,031 | A | * | 4/1956 | Martin, Jr. et al. | 33/781 |
| 2,817,906 | A | * | 12/1957 | Hall | 33/772 |
| 3,716,919 | A | * | 2/1973 | Evans | 33/781 |
| 3,791,038 | A | * | 2/1974 | Polydoris et al. | 33/780 |
| 4,136,451 | A | * | 1/1979 | Briand et al. | 33/772 |
| 4,276,695 | A | * | 7/1981 | Stansbury, Jr. | 33/781 |
| 4,377,850 | A | * | 3/1983 | Simpson | 33/773 |
| 5,067,249 | A | * | 11/1991 | Terrigno | 33/773 |
| 5,175,415 | A | * | 12/1992 | Guest | 33/700 |
| 7,040,036 | B1 | * | 5/2006 | Wang | 33/782 |
| 7,111,412 | B2 | | 9/2006 | Huang | 33/772 |
| 2006/0156573 | A1 | * | 7/2006 | Huang | 33/772 |
| 2008/0148591 | A1 | * | 6/2008 | Kao Lin | 33/772 |
| 2008/0256817 | A1 | * | 10/2008 | Watkins | 33/779 |

* cited by examiner

*Primary Examiner*—Yaritza Guadalupe-McCall  
(74) *Attorney, Agent, or Firm*—Charles E. Baxley

(57) ABSTRACT

A wheeled distance measuring device includes a housing attached to a pole, a counter attached to the housing and having a spindle extended out of the housing, and two gear members of different diameters selectively attached to the spindle, a wheel including a wheel axle attached to the housing, a carrier adjustably attached to the housing, a gear element rotatably attached to the carrier for selectively engaging with either of the gear members, and a gear coupling mechanism coupled between the wheel axle and the gear element for allowing the gear element to be rotated by the wheel axle to rotate either of the gear members and for forming either a metric or a British scale or unit or system.

9 Claims, 5 Drawing Sheets

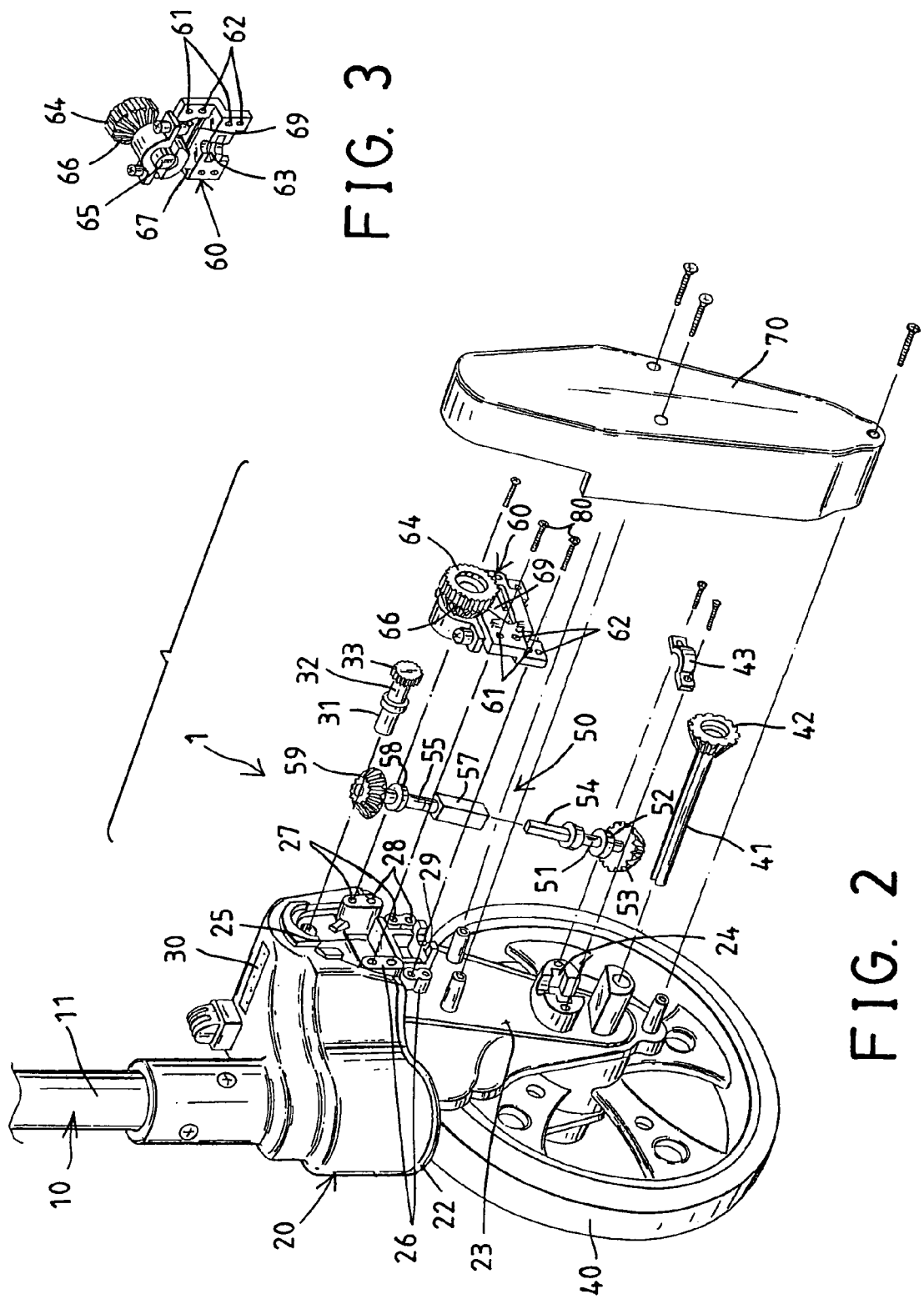

WHEELED DISTANCE MEASURING DEVICE

BACKGROUND OF THE INVENTION

1. Field of the Invention

The present invention relates to a wheeled distance measuring device, and more particularly to a wheeled distance measuring device including a structure for fitting different parts or elements of different scales or units or systems, such as the metric or British or English scales or units or systems.

2. Description of the Prior Art

Typical wheeled distance measuring devices comprise a wheel rotatably attached to a frame, a counter attached or mounted upon the frame, and a gear coupling mechanism coupled between the wheel and the counter for allowing the counter to be operated or actuated by the wheel and for conducting the distance measuring operations.

For example, U.S. Pat. No. 7,111,412 to Huang discloses one of the typical wheeled distance measuring devices comprising a wheel rotatably attached or mounted upon a push rod, a counter attached or mounted upon the push rod, a gear coupled mechanism coupled between the wheel and the counter for actuating or operating the counter to measure distances.

However, the gear coupled mechanism and the counter are good for only one scale system, such as for the metric scale or unit or system, or for the British or English scale or unit or system. The gear coupled mechanism and the counter should all be changed for different scale systems.

U.S. Patent Application Publication No. US2008/0148591 A1 to Kao Lin discloses another typical wheeled distance measuring device comprising a hollow handle including a grip handle and a fork provided with a wheel at the lower end of the fork, a counter mounted on the grip handle or the handle, and a gear coupling mechanism coupled between the wheel and the counter for allowing the counter to be operated or actuated by the wheel and for distance measuring purposes.

However, the gear coupling mechanism and the counter are good for only one scale system, such as for the metric scale or unit or system, or for the British or English scale or unit or system. The gear coupled mechanism and the counter should all be changed for different scale systems.

The present invention has arisen to mitigate and/or obviate the afore-described disadvantages of the conventional wheeled distance measuring devices.

SUMMARY OF THE INVENTION

The primary objective of the present invention is to provide a wheeled distance measuring device including an adjustable structure for fitting different parts or elements of different scales or units or systems, such as the metric or British or English scales or units or systems.

The other objective of the present invention is to provide a wheeled distance measuring device including an adjustable structure for allowing the distance measuring device to be easily manufactured with fewer parts or elements and for allowing almost all of the parts or elements of the distance measuring device to be used for both the metric and British or English scales or units or systems.

In accordance with one aspect of the invention, there is provided a wheeled distance measuring device comprising a longitudinal pole including a lower portion, a housing attached to the lower portion of the pole, and including a chamber formed therein, and including an extension extended therefrom, a counter attached to the housing and including a spindle having a first end extended out of the housing, and including a first gear member and a second gear member selectively provided on the first end of the spindle, the first gear member including a diameter smaller than that of the second gear member, a wheel including a wheel axle rotatably attached to the extension of the housing, a carrier adjustably attached to the housing and movable or adjustable up and down relative to the housing, a gear element rotatably attached to the carrier with a pivot shaft for selectively engaging with either the first gear member or the second gear member when the carrier is adjusted relative to the housing, and a gear coupling mechanism coupled between the wheel axle and the gear element for allowing the gear element to be rotated and driven by the wheel axle to selectively rotate either the first gear member or the second gear member for forming either a metric or a British scale or unit or system.

The housing includes a projection having an upper orifice and a lower aperture formed therein, and the carrier includes an upper orifice and a lower aperture for selectively aligning with the upper orifice and the lower aperture of the projection of the housing and for adjustably attaching the carrier to the housing and for allowing the carrier to be moved or adjusted relative to the housing to different positions.

The carrier includes a shoulder formed therein for engaging with the projection of the housing and for anchoring and positioning the carrier to the housing at a position where the upper orifice of the carrier is aligned with the upper orifice of the projection of the housing.

The housing includes a positioning ear extended therefrom, and the carrier includes a shoulder formed therein for engaging with the positioning ear of the housing and for anchoring and positioning the carrier to the housing at a position where the lower aperture of the carrier is aligned with the lower aperture of the projection of the housing.

The gear element includes a bevel gear, and the gear coupling mechanism includes a shank rotatably attached to the housing and the carrier, and the shank includes a bevel gear meshed or engaged with the bevel gear of the gear element for allowing the spindle of the counter to be rotated and driven by the gear element and the shank.

The carrier includes a socket opening formed therein, and the shank includes a circular protruding member extended therefrom and engaged with the socket opening of the carrier for rotatably attaching the shank to the carrier.

The wheel axle includes a bevel gear, and the gear coupling mechanism includes a stem rotatably attached to the housing, and the stem includes a bevel gear meshed with the bevel gear of the wheel axle for allowing the stem to be rotated and driven by the wheel axle.

The stem includes a non-circular stud extended therefrom, and the shank includes a non-circular passage formed in a lower portion of the shank for slidably receiving the non-circular stud of the stem and for allowing the shank to be moved and adjusted up and down relative to the stem.

The housing includes a socket opening formed therein, and the stem includes a circular protruding member extended therefrom and engaged with the socket opening of the housing for rotatably attaching the stem to the housing.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 2 is another partial exploded view of the wheeled distance measuring device;

FIG. 3 is a perspective view illustrating a supporting bracket of the wheeled distance measuring device;

DETAILED DESCRIPTION OF THE PREFERRED EMBODIMENT

Figure 1:
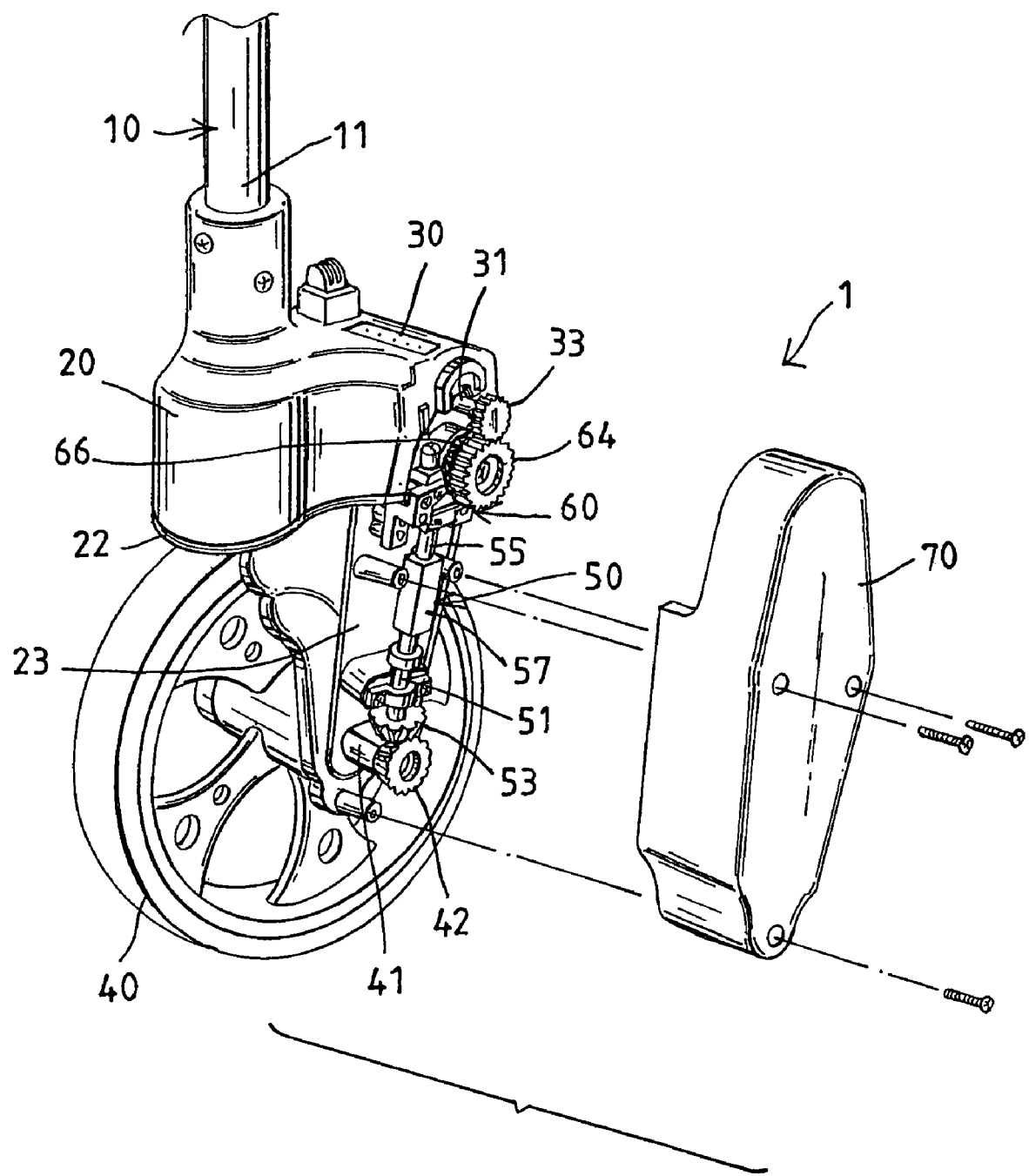
FIG. 1 is a partial exploded view of a wheeled distance measuring device in accordance with the present invention.

Referring to the drawings, and initially to FIGS. 1-2 and 4-5, a wheeled distance measuring device 1 in accordance with the present invention comprises a longitudinal pole 10 including a telescopic or foldable structure (not shown) having a lower portion 11 for attaching or mounting a housing 20 which includes a chamber 21 formed therein (FIGS. 5, 7) for receiving a counter 30 in the chamber 21 of the housing 20, and a cap 22 may further be provided and attached or secured to the housing 20 for stably retaining the counter 30 in the chamber 21 of the housing 20, and the housing 20 includes a fork or extension 23 extended downwardly therefrom for pivotally or rotatably attaching or mounting a wheel 40 with a wheel axle 41, in which the wheel axle 41 includes a bevel gear 42 attached or secured to the outer or free end thereof.

The counter 30 includes a spindle 31 having one end 32 extended out of the counter 30 and the housing 20 for selectively engaging with or attaching or mounting a gear member 33, 34, in which the gear member 33 (FIGS. 1-2 and 4-5) is provided for the British or English scale or unit or system and the gear member 33 includes a diameter smaller than that of the other gear member 34 (FIGS. 6-7) that is provided for the metric scale or unit or system. The housing 20 includes a socket opening 24 formed in the lower portion thereof and located close to the wheel axle 41, and includes a compartment 25 formed in the upper portion thereof and located close to the spindle 31 of the counter 30, and includes one or more (such as four) projections 26 extended outwardly therefrom, and the projections 26 each include an upper orifice 27 and a lower aperture 28 formed therein. The housing 20 includes a positioning ear 29 extended outwardly therefrom.

A gear coupling mechanism 50 includes a stem 51 having a circular protruding member 52 extended outwardly therefrom and rotatably or pivotally engaged into the socket opening 24 of the housing 20 for pivotally or rotatably attaching or mounting the stem 51 to the housing 20, a bracket 43 may be engaged with the circular protruding member 52 and secured to the housing 20 for stably retaining or mounting the stem 51 to the housing 20, the stem 51 includes another bevel gear 53 attached or secured to the one end or lower end thereof and meshed or engaged with the bevel gear 42 of the wheel axle 41 for allowing the stem 51 to be rotated or driven by the wheel axle 41 of the wheel 40. The stem 51 further includes a non-circular stud 54 extended upwardly therefrom, or includes a stud 54 having a non-circular cross section.

The gear coupling mechanism 50 further includes a shank 55 having a non-circular passage 56 formed in the lower portion 57 thereof for slidably receiving or engaging with the non-circular stud 54 of the stem 51 and for allowing the shank 55 to be moved or adjusted up and down relative to the stem 51, and for allowing the shank 55 to be rotated or driven by the stem 51 and the wheel axle 41 of the wheel 40. The shank 55 further includes another circular protruding member 58 extended outwardly therefrom and further includes another bevel gear 59 attached or secured to the one end or upper end thereof. The circular protruding member 58 and/or the bevel gear 59 are rotatably or pivotally received or engaged into the compartment 25 of the housing 20 and movable or adjustable up and down relative to the housing 20.

A bracket or frame or carrier 60 includes one or more (such as four) upper orifices 61 formed therein for selectively aligning with the upper orifices 27 of the projections 26 or of the housing 20 and for selectively securing to the housing 20 with one or more fasteners 80 (FIGS. 2, 4), and includes one or more (such as four) lower apertures 62 formed therein for selectively aligning with the lower apertures 28 of the projections 26 or of the housing 20 and for selectively securing to the housing 20 with one or more fasteners 81 (FIG. 6) and for allowing the carrier 60 to be moved or adjusted up and down relative to the housing 20. The carrier 60 includes a socket opening 63 formed therein (FIGS. 3, 5, 7, 9) for pivotally or rotatably receiving or attaching or mounting the circular protruding member 58 of the shank 55 and for pivotally or rotatably attaching or mounting the shank 55 to the carrier 60, and for allowing the shank 55 also to be moved or adjusted up and down relative to the housing 20.

A gear element 64 is rotatably or pivotally attached or secured to the carrier 60 with a pivot shaft 65 and meshed or engaged with the gear member 33 of the spindle 31 of the counter 30 for allowing the spindle 31 of the counter 30 to be rotated or driven by the gear element 64, and the gear element 64 further includes another bevel gear 66 attached or secured thereto and meshed or engaged with the bevel gear 59 of the shank 55 for allowing the spindle 31 of the counter 30 to be rotated or driven by the gear element 64 and the shank 55 and the stem 51 and the wheel axle 41 of the wheel 40. The movement or adjustment of the carrier 60 relative to the housing 20 allows the gear element 64 to be meshed or engaged with the gear members 33, 34 of different outer diameters selectively. A cover 70 may further be provided and attached or secured to the housing 20 and/or the extension 23 of the housing 20 for stably retaining the parts or elements in the housing 20 and/or in the cover 70.

Figure 8:
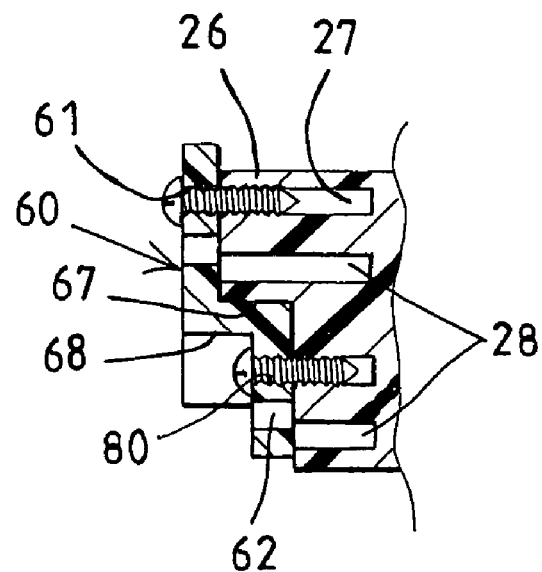
FIG. 8 is another partial cross sectional view taken along lines 8-8 of FIG. 4.
Figure 9:
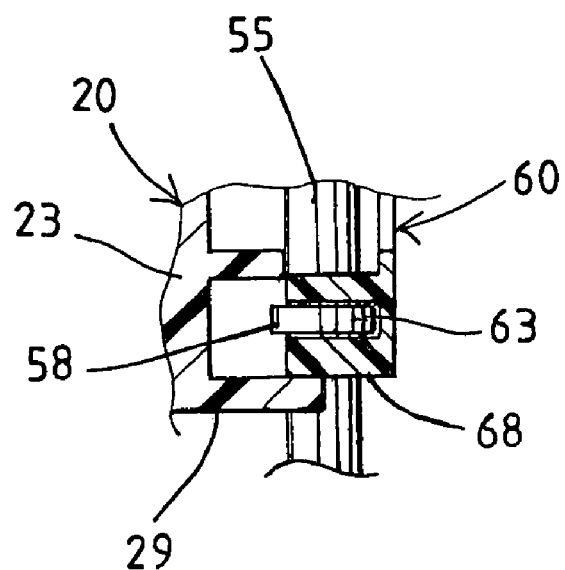
FIG. 9 is a further partial cross sectional view taken along lines 9-9 of FIG. 6.

It is preferable that the carrier 60 includes a first or upper shoulder 67 formed or provided therein (FIGS. 3, 8) for engaging with one or more of the projections 26 (FIG. 8) and for anchoring or positioning the carrier 60 to the housing 20 at the first position where the upper orifices 61 of the carrier 60 are aligned with the upper orifices 27 of the projections 26 or of the housing 20 and where the gear element 64 is located closer to the spindle 31 of the counter 30 for selectively engaging with the gear member 33 having a smaller outer diameter; and includes a second or lower shoulder 68 formed or provided therein (FIGS. 8, 9) for selectively engaging with the positioning ear 29 of the housing 20 and for anchoring or positioning the carrier 60 to the housing 20 at the second position where the lower apertures 62 of the carrier 60 are aligned with the lower apertures 28 of the projections 26 or of the housing 20 and where the gear element 64 is located distal to the spindle 31 of the counter 30 for selectively engaging with the gear member 34 having a greater outer diameter. The carrier 60 includes an opening 69 formed therein for receiving the bevel gear 59 of the shank 55 and for allowing the bevel gear 59 of the shank 55 to be extended out of the carrier 60 and to be meshed or engaged with the bevel gear 66 of the gear element 64.

Figure 5:
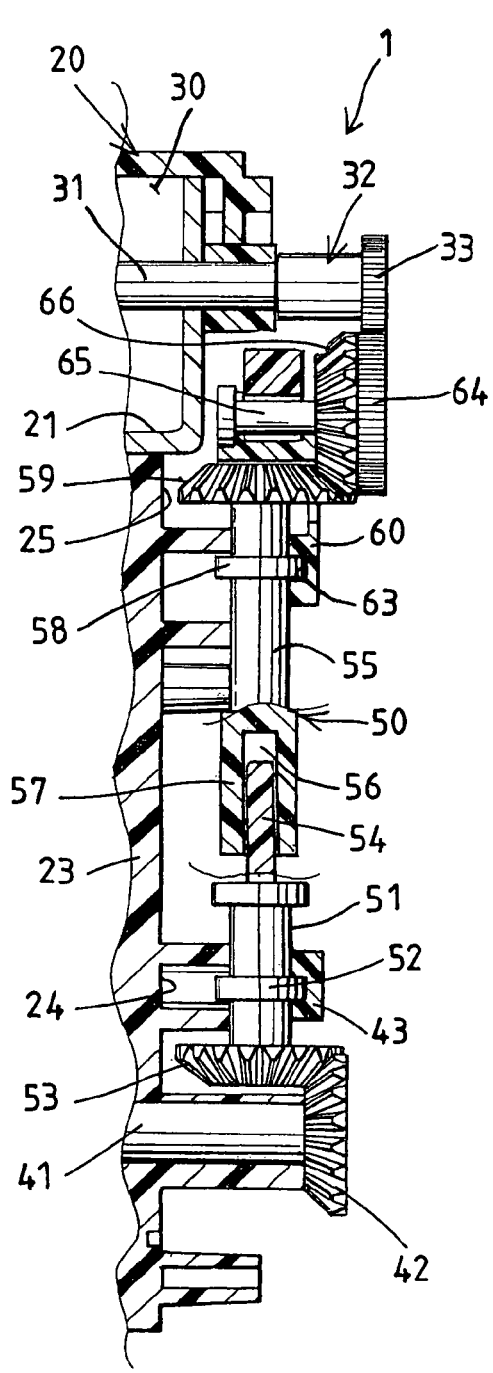
FIG. 5 is a partial cross sectional view of the wheeled distance measuring device taken along lines 5-5 of FIG. 4.
Figure 4:
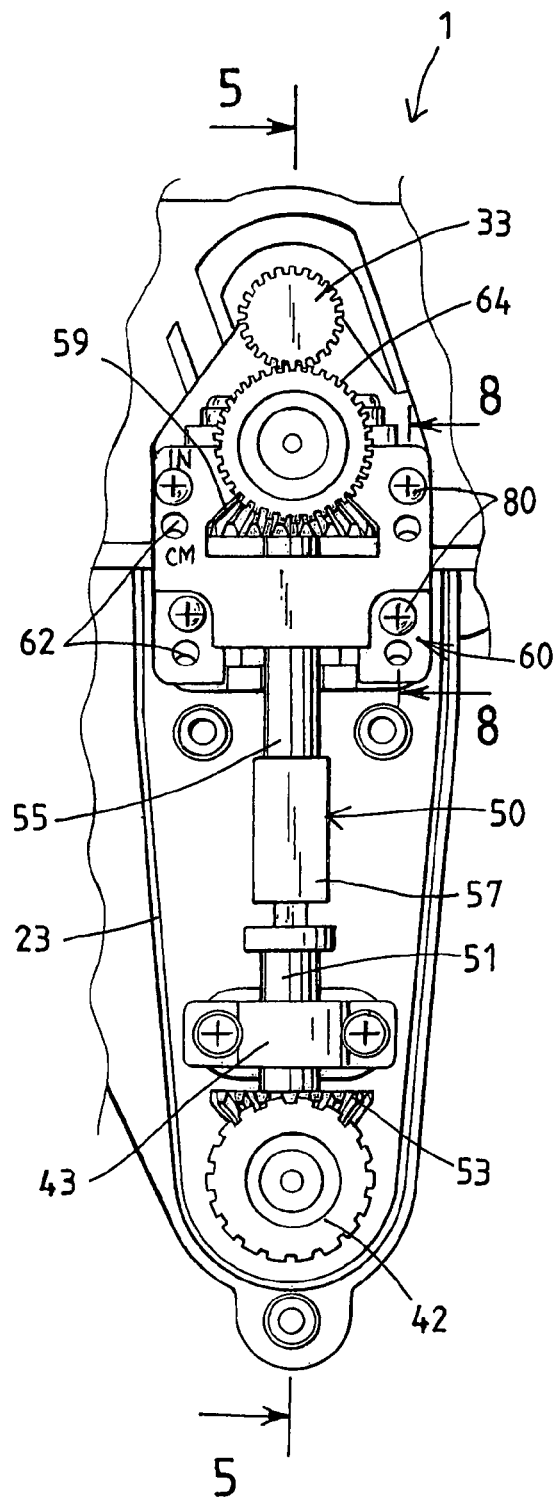
FIG. 4 is a partial plan schematic view of the wheeled distance measuring device illustrating the arrangement for a British or English scale or unit or system.
Figure 7:
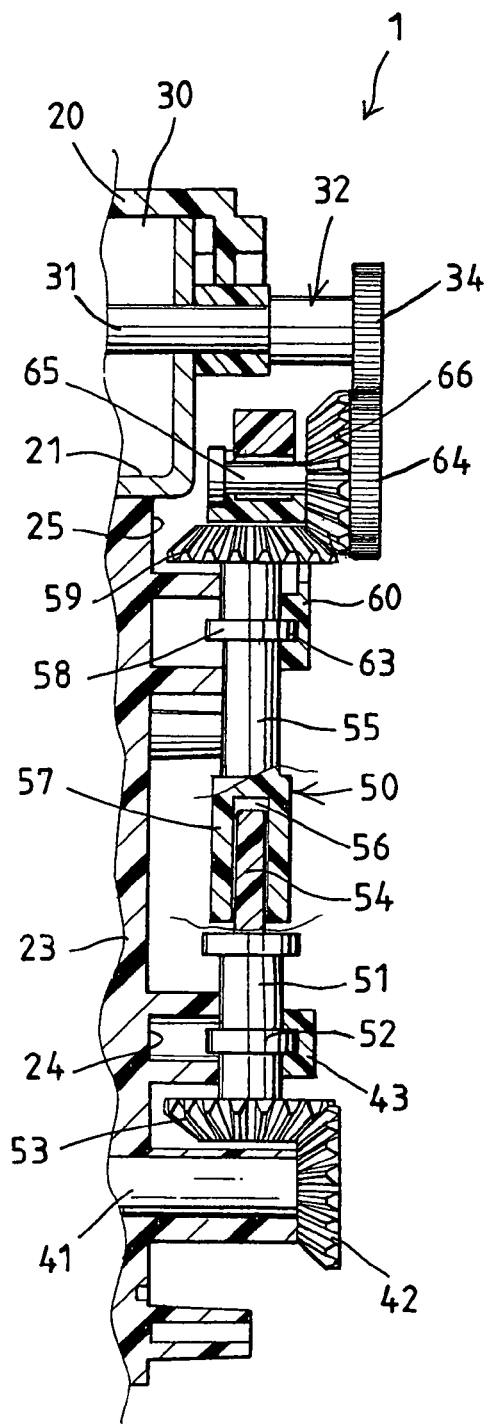
FIG. 7 is a partial cross sectional view of the wheeled distance measuring device taken along lines 7-7 of FIG. 6.
Figure 6:
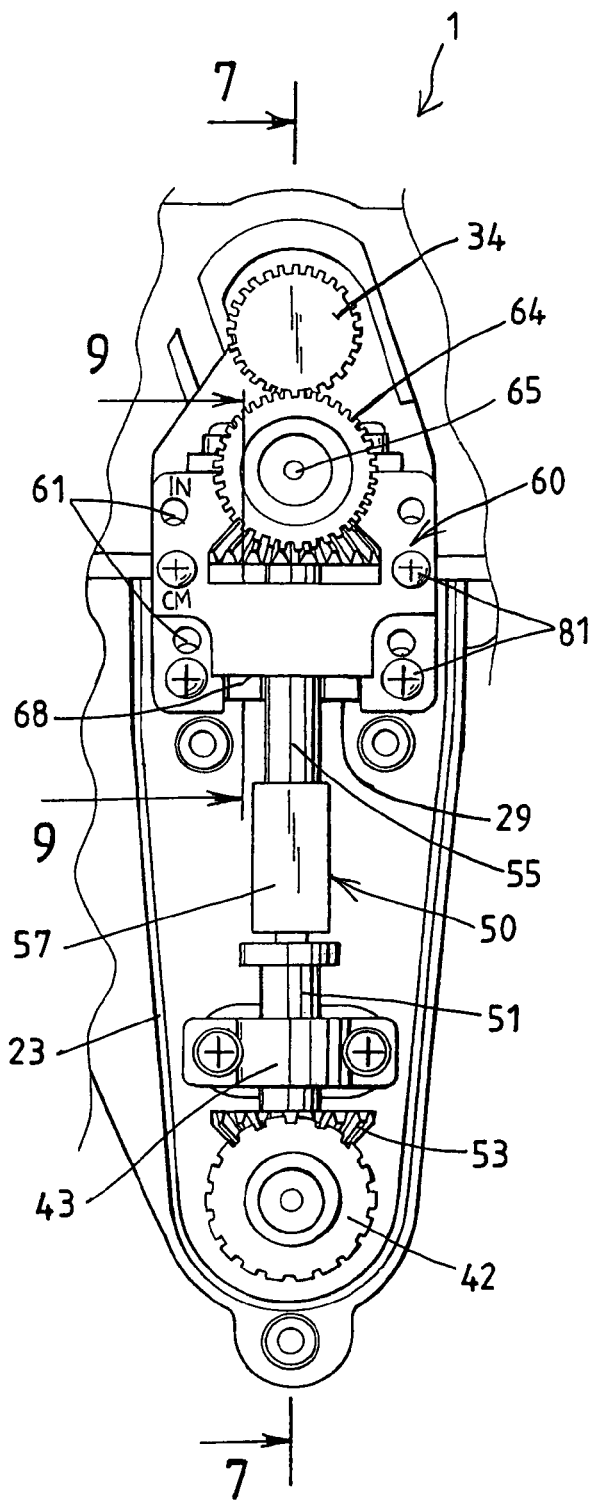
FIG. 6 is another partial plan schematic view of the wheeled distance measuring device illustrating the arrangement for a metric scale or unit or system.

In operation, as shown in FIGS. 4 and 5, the upper orifices 61 of the carrier 60 may be aligned with the upper orifices 27 of the projections 26 or of the housing 20, and the gear element 64 may be located closer to the spindle 31 of the counter 30 for selectively engaging with the gear member 33 having a smaller outer diameter and for forming a British or English scale or unit or system. Alternatively, as shown in FIGS. 6 and 7, the lower apertures 62 of the carrier 60 may be aligned with the lower apertures 28 of the projections 26 or of the housing 20, and the gear element 64 may be located distal to the spindle 31 of the counter 30 for selectively engaging with the gear member 34 having a greater outer diameter and for forming a metric scale or unit or system.

It is to be noted that almost all of the parts or elements of the wheeled distance measuring device 1 may be used for both the metric and the British or English scales or units or systems except the gear members 33, 34 of different outer diameters, or only the gear members 33, 34 of different outer diameters are required to be changed with each other when changing or converting between the metric and the British or English scales or units or systems, such that the manufacturing cost for the wheeled distance measuring device 1 may be suitably reduced, and such that the manufacturing procedures for the wheeled distance measuring device 1 may be suitably simplified. Alternatively, the spindle 31 and the gear member 33 may be formed integral, and the other spindle 31 and the gear member 34 may be formed integral, and the spindles 31 and the gear members 33, 34 and/or the counters 30 for different scales or units or systems may be changed with each other.

Accordingly, the wheeled distance measuring device in accordance with the present invention includes a structure for fitting different parts or elements of different scales or units or systems, such as the metric or British or English scales or units or systems, and for allowing the distance measuring device to be easily manufactured with fewer parts or elements.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A wheeled distance measuring device comprising:
   a longitudinal pole including a lower portion,
   a housing attached to said lower portion of said pole, and including a chamber formed therein, and including an extension extended therefrom,
   a counter attached to said housing and including a spindle having a first end extended out of said housing, and including a first gear member and a second gear member selectively provided on said first end of said spindle, said first gear member including a diameter smaller than that of said second gear member,
   a wheel including a wheel axle rotatably attached to said extension of said housing,
   a carrier adjustably attached to said housing and movable or adjustable up and down relative to said housing,
   a gear element rotatably attached to said carrier with a pivot shaft for selectively engaging with either said first gear member or said second gear member when said carrier is adjusted relative to said housing, and
   a gear coupling mechanism coupled between said wheel axle and said gear element for allowing said gear element to be rotated and driven by said wheel axle to selectively rotate either said first gear member or said second gear member.

2. The wheeled distance measuring device as claimed in claim 1, wherein said housing includes a projection having an upper orifice and a lower aperture formed therein, and said carrier includes an upper orifice and a lower aperture for selectively aligning with said upper orifice and said lower aperture of said projection of said housing and for adjustably attaching said carrier to said housing.

3. The wheeled distance measuring device as claimed in claim 2, wherein said carrier includes a shoulder formed therein for engaging with said projection of said housing and for anchoring and positioning said carrier to said housing at a position where said upper orifice of said carrier is aligned with said upper orifice of said projection of said housing.

4. The wheeled distance measuring device as claimed in claim 2, wherein said housing includes a positioning ear extended therefrom, and said carrier includes a shoulder formed therein for engaging with said positioning ear of said housing and for anchoring and positioning said carrier to said housing at a position where said lower aperture of said carrier is aligned with said lower aperture of said projection of said housing.

5. The wheeled distance measuring device as claimed in claim 1, wherein said gear element includes a bevel gear, and said gear coupling mechanism includes a shank rotatably attached to said housing and said carrier, and said shank includes a bevel gear meshed with said bevel gear of said gear element for allowing said spindle of said counter to be rotated and driven by said gear element and said shank.

6. The wheeled distance measuring device as claimed in claim 5, wherein said carrier includes a socket opening formed therein, and said shank includes a circular protruding member extended therefrom and engaged with said socket opening of said carrier for rotatably attaching said shank to said carrier.

7. The wheeled distance measuring device as claimed in claim 5, wherein said wheel axle includes a bevel gear, and said gear coupling mechanism includes a stem rotatably attached to said housing, and said stem includes a bevel gear meshed with said bevel gear of said wheel axle for allowing said stem to be rotated and driven by said wheel axle.

8. The wheeled distance measuring device as claimed in claim 7, wherein said stem includes a non-circular stud extended therefrom, and said shank includes a non-circular passage formed in a lower portion of said shank for slidably receiving said non-circular stud of said stem and for allowing said shank to be moved and adjusted up and down relative to said stem.

9. The wheeled distance measuring device as claimed in claim 7, wherein said housing includes a socket opening formed therein, and said stem includes a circular protruding member extended therefrom and engaged with said socket opening of said housing for rotatably attaching said stem to said housing.

* * * * *